United States Patent [19]

Butts

[11] Patent Number: 4,901,579
[45] Date of Patent: Feb. 20, 1990

[54] STRAY MAGNETIC FIELD CONTROL SYSTEM FOR VIBRATION TESTING APPARATUS

[75] Inventor: Gary Butts, Huntington Beach, Calif.

[73] Assignee: Ling Electronics, Inc., Anaheim, Calif.

[21] Appl. No.: 269,783

[22] Filed: Nov. 10, 1988

Related U.S. Application Data

[63] Continuation-in-part of Ser. No. 55,650, May 29, 1987, abandoned.

[51] Int. Cl.$^4$ .............................................. G01M 7/00
[52] U.S. Cl. ...................................... 73/668; 361/149
[58] Field of Search ................... 73/668; 361/149, 267; 307/91

[56] References Cited

U.S. PATENT DOCUMENTS

| | | | |
|---|---|---|---|
| 3,062,041 | 11/1962 | Spodnewski | 73/668 |
| 3,482,163 | 12/1969 | Peek | 361/149 |
| 4,402,032 | 8/1983 | Wilterdink | 361/149 |

Primary Examiner—John Chapman
Attorney, Agent, or Firm—Joseph V. Claeys; Joseph C. Sullivan

[57] ABSTRACT

A stray magnetic field control system compensates for the generation of stray magnetic flux by the magnetic structure (body) of a load support shaker apparatus. The circuit includes a Hall effect magnetic field sensor for measuring the stray magnetic field, an amplifier/filter connected to the sensor output, and an A/D converter connected to the output of the amplifier filter. A degauss coil for compensating for the stray flux is energized by an SCR phase controlled power supply which is in turn controlled as to its triggering time by a microprocessor.

7 Claims, 2 Drawing Sheets

4,901,579

STRAY MAGNETIC FIELD CONTROL SYSTEM FOR VIBRATION TESTING APPARATUS

RELATED APPLICATION

This is a continuation-in-part of applications Ser. No. 055,650, filed May 29, 1987, now abandoned.

TECHNICAL FIELD

This invention relates to vibration testing systems and more particularly to a control system for minimizing the stray magnetic field in the test environment of vibration testing systems of the type which employ direct current magnetic fields to produce the vibration energy. Vibration testing systems are often referred to for convenience as "shakers," or "shake tables."

BACKGROUND ART

There are a considerable number of vibration testing systems ("shakers") that are well-known in the prior art. These shakers are used to mechanically shake an item for the purpose of diagnostically testing responses to certain driving forces. The item is physically attached to a moving portion of the shaker and when the shaker is activated, the item is subjected to a variety of test conditions. The moving portion of the shaker is typically driven by a force which may be continuous, cyclical or impulsed. One class of these shakers employs the use of an electromagnetic field between field and armature windings. Various driving signals are impressed across the armature winding to control the movement of the shaker.

Vibration testing systems are employed to test the effects of vibration on various types of equipment and component parts. In vibration test systems which employ direct current magnetic fields to produce the required vibration energy high magnitude flux densities are produced. These high magnetic flux densities are also present in the test environment area of the vibration testing system which adversely affects the equipment or part being tested. To reduce the adverse effects of this high magnetic flux density in the test environment area, such vibration testing systems are usually provided with a suitable degaussing coil. The degaussing coil is positioned between the vibration testing system structure and the table thereof upon which the specimen to be tested is mounted. The degaussing coil operates by generating a magnetic field in opposition to the field produced by the vibration testing system which tends to cancel the undesired field.

In many situations in spite of the action of the degaussing coil, the level of the stray magnetic field is still high enough to adversely affect the equipment or part being tested. For example, the magnetic field produced by the magnetic structure (body) of the vibration testing system is due to saturation of the body's field. This saturated field creates a leakage flux that is not proportional to the field supply voltage. The degaussing coil (not saturated), however, produces a field which is proportional to the supply current. Accordingly, as the supply voltage varies with line voltage, and the coil resistance varies with coil temperature, there is a residual stray field which can be detrimental to a desirable test environment.

DISCLOSURE OF THE INVENTION

It is an object of the present invention to ensure that the vibration testing is conducted in an optimally low stray magnetic field environment.

It is a further object of the invention to provide a stray mangetic field control system which continually monitors the magnetic field in the test environment and maintains it at a desired low level.

It is a still further object of the invention to provide a stray magnetic field control system which will modulate a degaussing coil supply current to maintain optimum stray magnetic field characteristics.

These and other objects and advantages of the invention will become clear from the following summary.

The stray magnetic flux caused by the magnetic structure of the vibration testing systems is monitored and controlled by the control system of this invention.

The stray magnetic field control system of the present invention comprises a degauss coil, a Hall-Effect magnetic field sensor utilized to measure the stray magnetic field at a position near the area where the speciment to be tested is mounted, an amplifier/low pass filter means connected to the output of the sensor to amplify and remove noise from such output, an analog to digital converter connected to the output of the amplifier/filter, and a phase controlled degauss coil power supply for controlling the current supplied to the degauss coil. The output of the Hall-Effect sensor is suitably utilized to control the output of the phase controlled power supply such that the current supplied to the degauss coil is controlled in a manner to correct (minimize) the stray magnetic field.

BEST MODE FOR CARRYING OUT THE INVENTION

Figure 1:
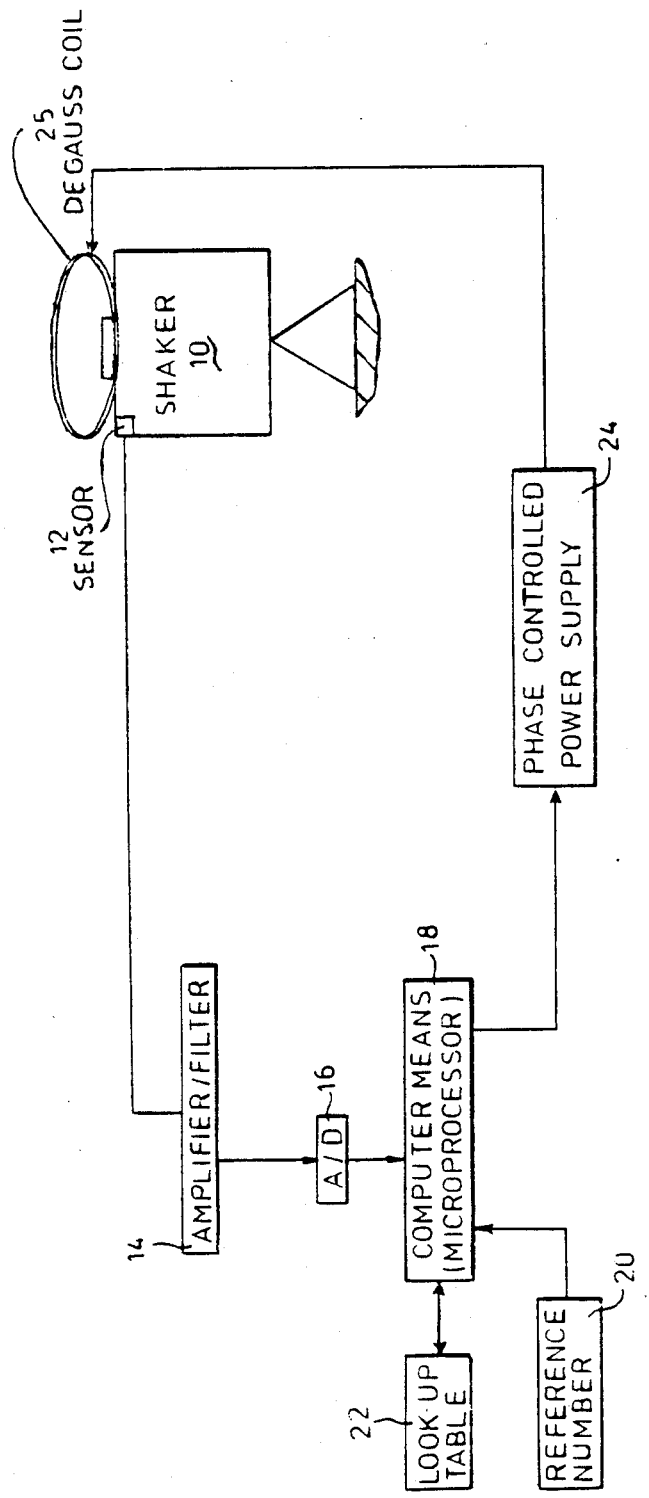
FIG. 1 is a block diagram of a system for controlling the stray magnetic field in accordance with this invention.

The general method of operation of the stray magnetic field control system of this invention can be readily understood by reference to FIG. 1. As shown in FIG. 1, the control system includes a means 12 for sensing the stray magnetic field in the test specimen mounting area of a vibration testing system or shaker 10. Preferably, means 12 is a Hall effect sensor device suitably mounted and positioned to sense the stray magnetic field. The Hall effect sensor device produces a voltage which is proportional to the surrounding stray magnetic field. The very low voltage output of the Hall effect sensor device 12 is amplified and has noise removed by a suitable amplifier/filter means 14. The output of amplifier/filter means 14 is proportional to the magnitude of the stray magnetic field sensed by means 12.

For example, amplifier/filter means 14 takes a very small signal, on the order of a few millivolts per gauss, and amplifies it into a signal that would have a range of 0 to +5 volts for a range of about 60 gauss. Thus, it is a straight voltage amplifier that converts the low voltage signal from the Hall effect sensor 12 to a signal in the range of 4 to 5 volts in preparation for application to an analog to digital converter.

The amplified and cleaned up (filtered) signal proportional to the stray magnetic field from amplifier/filter means 14, is applied to an analog to digital (A/D) converter 16. The analog signal from amplifier/filter means 14 is converted in A/D converter 16 to a digital number, which number now represents the strength of the stray magnetic field.

The system also includes a suitable computer means 18. Computer means 18 can be a generic microprocessor. In the particular arrangement illustrated and described in FIG. 2, an 8-bit, single chip microprocessor is used. The microprocessor 18 has the various algorithms, system time constants, control characteristics and the like maintained within the microprocessors internal ROM. During operation the control loop works to provide timely and precise control of the stray magnetic field. The microprocessor 18 controls the operation of the control system as well as controlling access to the look-up table and making decisions about what to do with the information, and furnishing the correct information to the phase controlled power supply to control the current to the degauss coil. That is, it performs linearization of the transfer function between the analog voltage proportional to the stray magnetic field and the time delay of the trigger signal to the phase controlled power supply 24 and also assures a fast recalculation time for the transfer function as changes occur in the stray magnetic field. Any error in the stray magnetic field outside a preselected dead band will result in a change in the delay time of the trigger pulse to the phase controlled power supply 24. Although these functions can be provided by any microprocessor with RAM outboard, it is usually more convenient to have it all in one package.

Microprocessor 18 takes the digital number supplied to it from A/D converter 16 and compares it with a reference number, illustrated by the block 20. The reference number represents the desired strength of the stray magnetic field surrounding the Hall effect sensor device 12. Depending upon whether the number from the A/D converter is larger or smaller than the reference, the microprocessor 18 goes to a look-up table 22 which tells the microprocessor how to react to this deviation or "error." The reference number block 20 and look-up table block 22 are shown as individual blocks but would usually be provided as programmed firmware or in RAM as software.

Microprocessor 18 takes the information from the look-up table and provides a control signal to the phase controlled power supply 24. The power supply 24 is responsive to this control signal from microprocessor 18 and the output thereof is controlled accordingly to either increase or decrease the current supplied to the degauss coil 25, to correct (minimize) the stray magnetic field.

Figure 2:
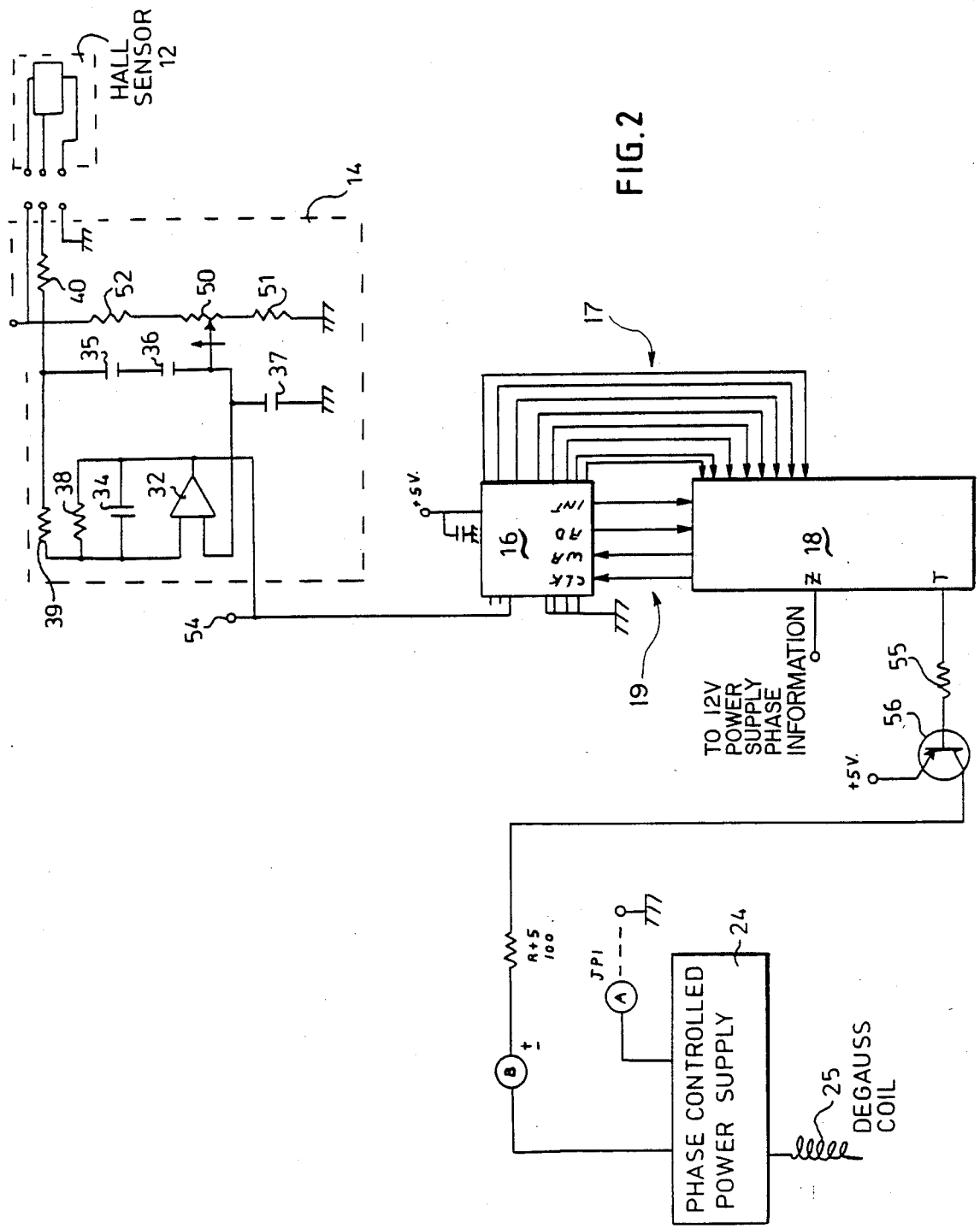
FIG. 2 is a schematic circuit diagram of one embodiment of the stray magnetic field control system of the present invention.

FIG. 2 shows a detailed schematic circuit diagram of one embodiment of the control system of ths invention. As shown, the Hall effect magnetic field sensor 12, is positioned to measure the stray magnetic field generated by the shaker 10 at a position near the area where the specimen to be tested is mounted. Obviously, sensor 12 should be distanced from ferrous materials, electrical coils, or other magnetic field influences to optimize system performance. The output of the sensor 12 is a voltage ofset from its 0 Gaussian voltage of approximately 6.0 volts. The sensor requires a stable 12.0 VDC supply. To this end, a separate voltage regulator and power supply (not shown) may be provided. The output sensitivity of the sensor 12 is approximately 1.5 mV/Gauss and varies over or under the nominal 6 volts zero Gaussian voltage depending on stray flux polarities.

The voltage from sensor 12 is amplified and filtered by the amplifier/low pass filter means 14 formed by operational amplifier 32, capacitors 34, 25, 36, and 37 and resistors 38, 39, and 40. Potentiometer 50 is connected to ground through resistor 51 and operates through resistor 52 to provide the offset adjustment for the sensor 12. The voltage at terminal point 54 should be approximately 2.5 volts when the system is operational and the stray field conditions are as desired. A voltage above 2.5 volts at terminal point 54 indicates that too much current is flowing to the degauss coil 25 and a voltage below 2.5 volts indicates that too little current is flowing. The reference for the stray flux control voltage is internally set to a digital value of 128 which corresponds to an input analog voltage of approximately 2.5 volts. The output from the amplifier 32 is connected to analog to digital converter 16 which in turn is connected to microprocessor 18 in conventional manner through a parallel interface. As shown in FIG. 2, the A/D converter 16 is connected with the microprocessor 18 via a conventional data path, generally designated at 17, and control path, generally designated at 19. The data path 17 comprises the eight leads which provide the 8 data bits to the 8-bit microprocessor 18. The control path 19 comprises four control leads: the CLK (clock) lead, the WR (write) lead over which the microprocessor tells the A/D converter to commence a conversion, the RD (read) lead over which the microprocessor is told to read the information, and the INT (interrupt) lead over which the microprocessor is told that the conversion is complete.

The current to the degauss coil 25 is controlled by phase control employing a conventional phase controlled power supply 24. Appropriate trigger signals are provided to phase controlled power supply 24 to control the output thereof to either increase or decrease the current supplied degauss coil 25 to correct (minimize) the stray magnetic field. This is simply accomplished by phase control in well known manner. That is, by controlling the phase relationship between the gate trigger signal and the A-C supply voltage, the percentage of the "on" time in each cycle can be controlled to thereby control the current supplied to degauss coil 25. Power supply 24 may employ a silicon controlled rectifier (SCR), a bi-directional SCR (Triac), or other suitable control element.

The internal power supply is arranged to supply 12 volts for the System use and also to supply zero crossing phase information to the Z terminal of microprocessor 18 in the form of a square wave with transition to below 1.0 volts and above 2.5 volts at every zero crossing of the 115 volts AC supply line. The direction of these transitions is unimportant but must occur with the power line zero crossings. Using the information available from the sensor 12, a longer or shorter trigger delay is calculated by the microprocessor 18 if there is a deviation from the internal reference 20, which can be programmed in as firmware or in RAM as software. The actual delayed trigger pulse is initiated by lowering the voltage on the microprocessor T terminal which is buffered and inverted by resistor 55 and transistor 56 for application to the phase controlled power supply 24. The output is a transition to 5 VDC after the appropriate delay. The trigger pulse occurs once for each half cycle of the 115 VAC line and the effective control delay range of the microprocessor is from approximately 100 microseconds after zero crossing to 6.5 milliseconds after the zero crossing.

The system of the present invention functions as an infinite gain, dead band control system. That is, any error in stray flux outside of the dead band will result in a change in the delay time of the supply trigger pulse to the phase controlled power supply 24. Even the smallest offset outside of the dead band will ultimately assert the full control range of the control system if the aforementioned change does not correct the error condition. If large errors are measured, then the delay will change rapidly and will continue more slowly as the error is reduced. The control range of the control system is approximately 65% to 95% of the field supply voltage. This corresponds to a stray field control range of approximately 40 gauss total.

Although a preferred embodiment has been herein disclosed and described in detail, it should be understood that this invention is in no sense limited thereby and its scope is to be determined by that of the appended claims.

I claim:

1. A stray magnetic field control system for a vibration testing apparatus, comprising:
   a degauss coil disposed in the test environment area of said vibration testing apparatus;
   a magnetic field sensor for measuring stray flux emitted by said vibration testing apparatus;
   an amplifier/filter connected to an output of the magnetic field sensor;
   an A/D converter connected to the output of the amplifier/filter;
   a microprocessor which receives a plurality of digital data bit and control outputs from said A/D converter and which provides a plurality of inputs to said A/D converter;
   a power supply connected to provide DC power and zero crossing phase information to said microprocessor and DC power to said amplifier/filter; and
   a phase controlled power supply which is controlled by an output from said microprocessor and which triggers periodically to provide current to said degauss coil which generates a magnetic field in a direction to cancel the stray magnetic field.

2. A stray magnetic field control system for vibration test apparatus comprising:
   a degauss coil disposed near the test environment area of said vibration testing apparatus;
   a phase controlled power supply connected to supply current to said degauss coil;
   sensing means for sensing the stray magnetic field in said test environment area and providing an output representative of the strength of said stray magnetic field;
   an analog to digital converter responsive to the output of said sensing means and producing a digital output;
   a computer responsive to the digital output of said A/D converter for providing control trigger signals to said phase controlled power supply to control the current supplied to said degauss coil operative to generate an opposing magnetic field to maintain said stray magnetic field at a desired low level; and
   a power supply for providing DC power to said system and DC power and zero crossing phase information to said computer.

3. The stray magnetic field control system recited in claim 2, wherein said computer includes means for determining the deviation between the actual strength of said stray magnetic field and a predetermined desired strength.

4. The stray magnetic field control system recited in claim 3, wherein said means for determining the deviation between the actual strength of said stray magnetic field and a predetermined desired strength includes a reference and a look-up table.

5. The stray magnetic field control system recited in claim 2, wherein said sensing means includes a Hall-Effect sensor.

6. The stray magnetic field control system recited in claim 5, further including an amplifier/filter means for amplifying and removing noise from the output of said Hall-Effect sensor and producing an amplified and cleaned up signal proportional to the strength of said stray magnetic field.

7. The stray magnetic field control system recited in claim 6, wherein said amplifier/filter means comprises an operational amplifier and a low pass filter.

* * * * *

UNITED STATES PATENT AND TRADEMARK OFFICE
CERTIFICATE OF CORRECTION

PATENT NO. : 4,901,579
DATED : 02/20/90
INVENTOR(S) : Gary Butts

It is certified that error appears in the above-identified patent and that said Letters Patent is hereby corrected as shown below:

Column 3, lines 65, change "ofset" to --offset--.

Column 4, line 7, change "25" to --35--.

Signed and Sealed this

Eighth Day of January, 1991

Attest:

HARRY F. MANBECK, JR.

*Attesting Officer*   *Commissioner of Patents and Trademarks*